(12) United States Patent
Xinkun (10) Patent No.: US 11,168,467 B2
(45) Date of Patent: Nov. 9, 2021

(54) METHOD AND APPARATUS FOR CONNECTING A TUB DRAIN TO THE MAIN PLUMBING OF A STRUCTURE

(71) Applicant: Uni-moulding Inc., Huntley, IL (US)

(72) Inventor: Yu Xinkun, Xiamen (CN)

(73) Assignee: Uni-Moulding Inc., Huntley, IL (US)

( * ) Notice: Subject to any disclaimer, the term of this patent is extended or adjusted under 35 U.S.C. 154(b) by 0 days.

(21) Appl. No.: 16/866,863

(22) Filed: May 5, 2020

(65) Prior Publication Data

US 2021/0054605 A1 Feb. 25, 2021

Related U.S. Application Data (60) Provisional application No. 62/889,843, filed on Aug. 21, 2019.

(51) Int. Cl.
*E03C 1/20* (2006.01)
*F16L 21/04* (2006.01)

(52) U.S. Cl.
CPC ............... *E03C 1/20* (2013.01); *F16L 21/04* (2013.01)

(58) Field of Classification Search
CPC ..... E03C 1/20; E03C 1/14; E03C 1/16; E03C 1/182; F16L 21/007; F16L 21/04
USPC ............ 285/56–60, 139.2, 141.1, 142.1, 204
See application file for complete search history.

(56) References Cited

U.S. PATENT DOCUMENTS

| 3,615,108 | A | * | 10/1971 | Toth | F16L 55/11 |
|||||| 285/46 |
| 3,700,381 | A | | 10/1972 | Deeke | |
| 3,751,078 | A | * | 8/1973 | O'Brian | F16L 21/04 |
|||||| 285/339 |
| 5,931,200 | A | | 8/1999 | Mulvey et al. | |
| 9,551,138 | B2 | | 1/2017 | McLeod et al. | |
| 2017/0058498 | A1 | | 3/2017 | Castellote | |
| 2018/0045344 | A1 | | 2/2018 | Cloutier | |

FOREIGN PATENT DOCUMENTS

CN 203836193 U 9/2014

* cited by examiner

*Primary Examiner* — Janie M Loeppke
(74) *Attorney, Agent, or Firm* — Jansson Munger McKinley & Kirby Ltd (57) ABSTRACT

An apparatus for connecting the plumbing of a tub to the main plumbing of a structure has a drain body which either directly connects to the main plumbing or uses an external pipe and/or a coupler to connect to the main plumbing. The apparatus has a flange which secures the entire apparatus to the mounting surface for the tub. A compression cap aids in guiding plumbing attached to the tub through the apparatus. A gasket aids in creating a water-tight or nearly water-tight seal. A method of using the apparatus aids in ease of installation of the tub.

11 Claims, 5 Drawing Sheets

METHOD AND APPARATUS FOR CONNECTING A TUB DRAIN TO THE MAIN PLUMBING OF A STRUCTURE

CROSS REFERENCE TO RELATED APPLICATION AND INCORPORATION BY REFERENCE

This application claims priority to and is a non-provisional application of the previously filed United States of America Provisional Patent Application titled METHOD AND APPARATUS FOR CONNECTING A TUB DRAIN TO THE MAIN PLUMBING OF A STRUCTURE with an application filing date of Aug. 21, 2019 in the United States Patent and Trademark Office, with Application No. 62/889,843 by the same inventive entity. The entirety of Application No. 62/889,843 being incorporated herein by reference to provide continuity of disclosure.

FIELD OF THE INVENTION

This invention relates to a method and apparatus for connecting a tub drain to the main plumbing of a structure and, more particularly, to a method and apparatus for connecting a tub drain to the main plumbing of a structure that can provide efficient installation and removal of the tub. A method of using the same is also disclosed.

BACKGROUND OF THE INVENTION

The installation of a bathtub (also a "tub") can be a difficult process. The tub not only has to be placed in a desired location, but also the tub drain has to be connected to the main plumbing of the structure. This can be a difficult process because the parts of the tub drain needed to make the connection with the main plumbing of the structure are usually on the underside of the tub. Once the tub is placed, the components of the tub drain, as well as the main plumbing of the structure, cannot be easily accessed.

In new construction, making the connection between the tub drain and the main plumbing of the structure may not be as difficult because the underside of the tub may be accessible because the sheet rock or other material for the ceiling for the room underneath may not be in place. If the ceiling for the room underneath the room where the tub is being installed has been removed in existing construction, making this connection may not be as difficult either. However, once the ceiling for the room underneath the room where the tub is being installed is in place, the process of making the connection is much more difficult. A method and apparatus that makes the process of connecting the tub drain to the main plumbing of the structure simpler will be a useful invention.

It is not only difficult to connect the tub drain to the main plumbing of the house during installation of the tub, but also it is difficult to disconnect during removal of the tub. Once the tub is installed, the connection between the tub drain and the main plumbing of the structure is underneath the tub and is generally very hard to access without removing the ceiling material of the room underneath. A method and apparatus that simplifies the process of disconnecting the tub drain from the main plumbing of the structure will be a useful invention.

Moreover, a water-tight connection or a nearly water-tight connection is needed between the drain of the tub and the main plumbing of the structure. If a water-tight connection or nearly water-tight connection is not made, water can leak from the plumbing and damage any part of the structure upon which it leaks. A method and apparatus that makes connecting or disconnecting the tub drain to the main plumbing of the structure during installation or removal of a tub simpler, but also creates a water-tight or nearly water-tight connection, will be a useful invention.

Also, tubs vary in size, placement of the drain and plumbing, and placement of the tub in relation to the existing structure. The placement of the drain or the tub can make installation challenging. A method and apparatus that accommodates for these variances will be a useful invention.

SUMMARY OF THE INVENTION

An objective of the present invention is the provision of a method and apparatus for connecting a tub drain to the main plumbing of a structure which simplifies the process of connecting the tub drain to the main plumbing of the structure especially when the tub is on a ground floor of the structure or the ceiling of the room underneath the room in which the tub is being installed is in place.

Another objective of the present invention is the provision of a method and apparatus for connecting a tub drain to the main plumbing of a structure which simplifies the process of disconnecting the tub drain from the main plumbing of the structure when removing a tub especially when the tub is on a ground floor of the structure or the ceiling of the room underneath the room in which the tub is being installed is in place.

A further objective of the present invention is the provision of a method and apparatus for connecting a tub drain to the main plumbing of a structure which allows the plumbing of the tub drain to be installed into the device of this invention by placing a tail pipe attached to the tub drain within the device without fastening the device to the tub.

A still further objective of the present invention is the provision of a method and apparatus for connecting a tub drain to the main plumbing of a structure which creates a water-tight or near water-tight connection.

Finally, an objective of the present invention is the provision of a method for using the device of this invention to connect a tub drain to the main plumbing of a structure.

Other objectives and advantages of the present invention will become apparent to those of ordinary skill in the art upon review of the disclosure herein.

BRIEF DESCRIPTION OF THE DRAWINGS

FIG. 6 depicts a process flow chart of method 200 of this invention.

Throughout the figures of the drawings, where the same part appears in more than one figure of the drawings, the same number is applied thereto.

DESCRIPTION OF THE PREFERRED EMBODIMENTS

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

Throughout this disclosure, the term structure is used. The term structure encompasses any building in which a tub can be installed. The building can be commercial or residential and examples include a hotel or a house and all suitable buildings are encompassed by this disclosure.

Throughout the disclosure, the terms "device" and "apparatus" are used interchangeably and have the same meaning.

Now adding FIG. 1, FIG. 2, FIG. 3, FIG. 4, and FIG. 5 to the consideration, the structure and function of drain device 100 can be clearly seen. Device 100 connects tub plumbing 116 to the main plumbing of the structure 110 to enable waste water drainage from the tub 102 to the main plumbing of the structure 110. Main plumbing of the structure 110 may have a p-trap 106. Generally, tub 102 has tub plumbing 116 which can be any suitable tub plumbing including, but not limited to, waste drain pipe 116a and overflow drain pipe 116b. The tub plumbing 116 is attached to a tail pipe 104 and the tail pipe 104 inserts into device 100.

Device 100 may have an optional coupler 160 to attach device 100 top-trap 106. A piece of external pipe 170 may attach to device 100 and then, external pipe 170 may attach to p-trap 106. Or, the piece of external pipe 170 may attach to coupler 160 and coupler 160 may attach top-trap 106. Or, the coupler 160 and the external pipe 170 may not be present and device 100 attaches directly to p-trap 106. P-trap 106 attaches to and is part of the main plumbing 110 of the structure.

P-Trap 106 may be a standard p-trap as is commercially available and in use in many tub installations. Or, p-trap 106 may be any plumbing device or mechanism that aids in connecting the tub plumbing 116 to the main plumbing 110 of the structure and all such attachment mechanisms are encompassed by this disclosure and are hereinafter referenced as p-trap 106. P-trap 106 is part of the main plumbing of the structure 110 and is the part of the main plumbing of the structure 110 that connects to device 100, coupler 160, or external pipe 170.

It is preferred that the device 100 of this invention be a single, unitary piece. Coupler 160 is optional. But, if coupler 160 is used, coupler 160 can be part of the single, unitary piece, but it is preferred that it be a separate piece to allow great flexibility in installation of the tub 102 as p-trap 106 may vary in size from one structure to the next. External pipe 170 is optional. But, if external pipe 170 is used, external pipe 170 can be part of the single, unitary piece, but it is preferred that it be a separate piece to allow great flexibility in installation of the tub 102 as p-trap 106 may vary in size from one structure to the next.

A tail pipe 104 is attached tub plumbing 116 of tub 102. Tail pipe 104 inserts into device 100 through drain aperture 112. Water from tub 102 exits through tub plumbing 116 to tail pipe 104, travels through device 100 (and external pipe 170 and coupler 160, if present) to p-trap 106 and finally to the main plumbing 110 of the structure.

Figure 5:
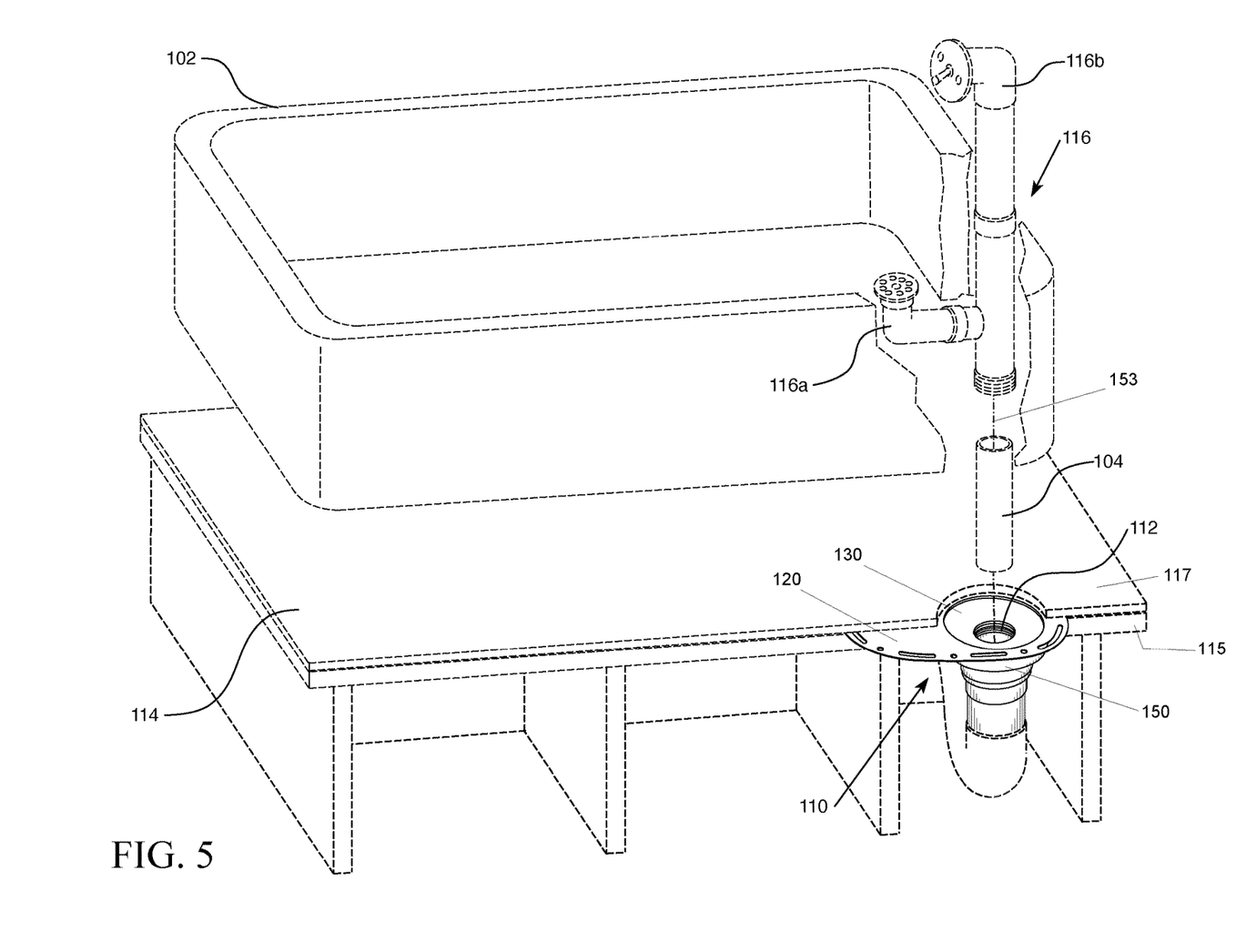
FIG. 5 depicts an exploded perspective view of the installation of tub 102, tub plumbing 116, tail pipe 104, device 100, and p-trap 106 with tub 102, tub plumbing 116, tail pipe 104, p-trap 106, and mounting surface 114 and the surrounding structure depicted in phantom.

Device 100 has a flange 120 associated with an upper side 121 of drain body 150 that attaches to the mounting surface 114 beneath tub 102 upon which the tub 102 will rest. The flange 120 is attached to the mounting surface 114 through flange apertures 122 and any suitable fastener, such as screws or nails, can be utilized and is encompassed by this disclosure. Mounting surface 114 may consist of a subfloor 115 and a covering surface 117 over subfloor 115. Flange 120 is shown in FIG. 5 as being attached to subfloor 115 and at least partially overlaid by covering surface 117.

Tail pipe 104 is not connected to device 100 through fasteners. Tail pipe 104 is inserted into and rests in device 100 (and external pipe 170 and coupler 160, if present) and exits device 100 (and external pipe 170 and coupler 160, if present) and enters p-trap 106. The connection is stabilized due to the fact that flange 120 is securely fastened to mounting surface 114 and flange 120 is a unitary piece with the drain body 150. Flange 120 assists in maintaining a stable connection between tail pipe 104, device 100 (and external pipe 170 and coupler 160, if present), and p-trap 106 during use of tub 102.

The flange 120 can be any desired shape, but an oval or other elliptical shape is preferred. The oval-shaped flange 120 can account for different positioning of the tub drain and/or plumbing 116. For example, if the tub drain and/or plumbing 116 is on the left hand side of the tub 102 and a wall is on the left hand side of the tub 102, the oval-shaped flange 120 can be positioned such that the majority of the oval is on the right hand side of the tub drain and/or plumbing 116 and faces the right hand side of the tub 102.

Device 100 may have attached to it an external pipe 170. External pipe 170 can account for varying configurations of tub plumbing 116, p-trap 106, and main structure plumbing 110. External pipe 170 can correct for any deficiencies in the length between attachment end 154 of drain body 150 or attachment end 162 of coupler 160 (if present) and p-trap 106.

Device 100 has an optional coupler 160. Coupler 160 connects device 100 top-trap 106. Coupler 160 can aid in attachment when the diameter of the attachment end 108 of p-trap 106 is lesser than or greater than the diameter of attachment end 154 of drain body 150 or attachment end 172 of external pipe 170 (if present). Coupler 160 can connect p-trap 106 to drain body 150 or external pipe 170 even where there are varying diameters of attachment ends 108 and 154 or 172. This provides great flexibility in the use and installation of device 100.

If coupler 160 is not present, then the attachment end 108 of p-trap 106 is directly connected to the attachment end 154 of drain body 150 or attachment end 172 of external pipe 170 (if present).

Drain body 150 may include an upper side 121 and a lower side 123. Upper side 121 is attached to flange 120 and rests below the mounting surface 114 of the tub 102. Drain body 150 accepts waste water as it flows from tub plumbing 116 to the tail pipe 104 and ultimately to the main plumbing 110 of the structure thereby providing a waste-water connection between the tail pipe 104 of the tub 102 and building plumbing 110. As illustrated in the cut-away and exploded views of FIGS. 3 and 4, drain body 150 defines upper 125 and lower 127 openings and a conduit 129 therebetween defining drain body aperture 112. As is well shown in FIG. 3, drain body 150 includes a gasket support surface 137 around aperture 112 between upper and lower openings 125, 127.

Compression cap 130 is attached to the drain body 150 on the upper side 149 of the drain body 150. Drain body 150 has compression cap ledge 152 and compression cap 130 is securely attached to drain body 150 through compression cap ledge 152. The lip 126 of compression cap 130 rests on the compression cap ledge 152. Compression cap 130 aids in the placement of the tail pipe 104 in device 100.

Compression cap 130 acts as a guide to direct tail pipe 104 from the mounting surface 114 into the drain body 150 and ultimately p-trap 106. Compression cap 130 has a wide upper aperture 134 to receive the tail pipe 104 and sloped (i.e., tapered) sides 131 to guide the tail pipe 104 toward drain body aperture 112 and into drain body 150 as can be appreciated by reference to FIGS. 2 and 5. This is especially useful in that tub 102 may be awkward and heavy and it will partially block the view of upper aperture 134 during installation. The wide upper aperture 134 and sloping sides 131 of compression cap 130 act as a guide. Tail pipe 104 inserts into upper aperture 134 and then, into a narrower lower aperture 136 of compression cap 130.

Figure 3:
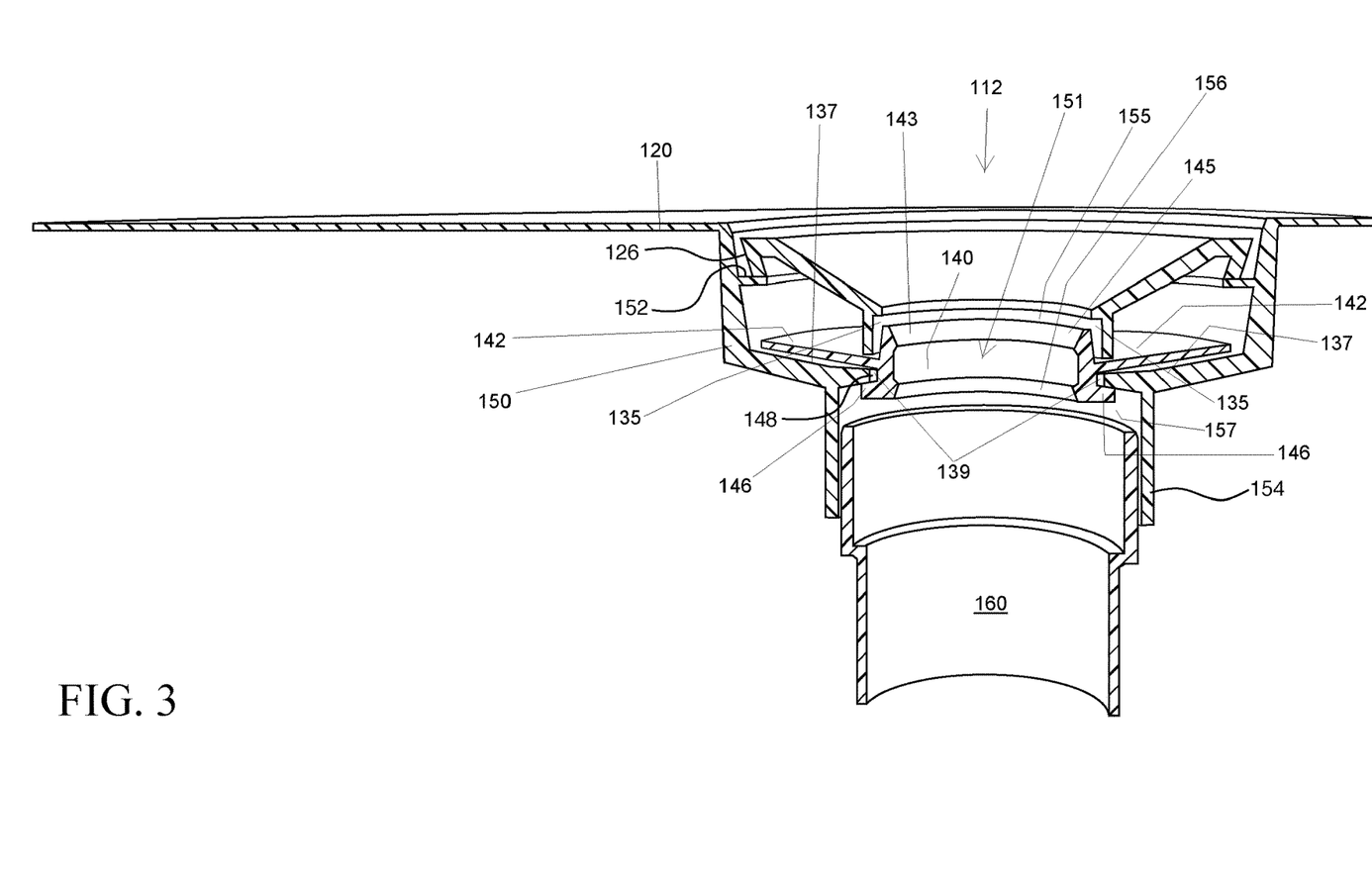
FIG. 3 depicts a cross-section view of device 100.
Figure 4:
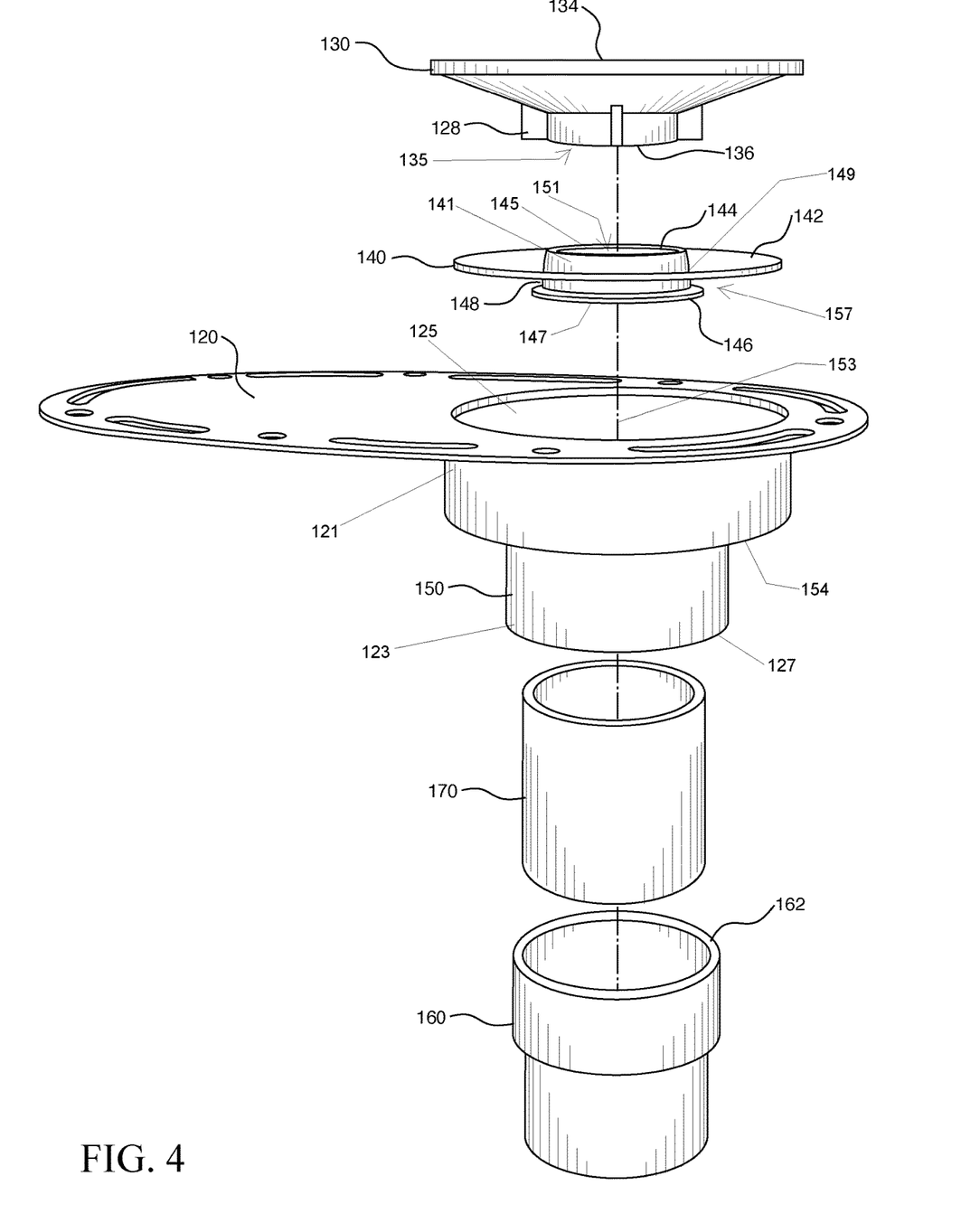
FIG. 4 depicts an exploded perspective view of device 100.

In the examples and as shown in FIGS. 3-4, compression cap 130 may terminate in a downwardly depending circumferential gasket-support surface 135 and such gasket-support surface 135 may define lower aperture 136 of compression cap 130. In FIGS. 3-4, lower aperture 136 of gasket-support surface 135 defines a cylindrical aperture 136.

Figure 1:
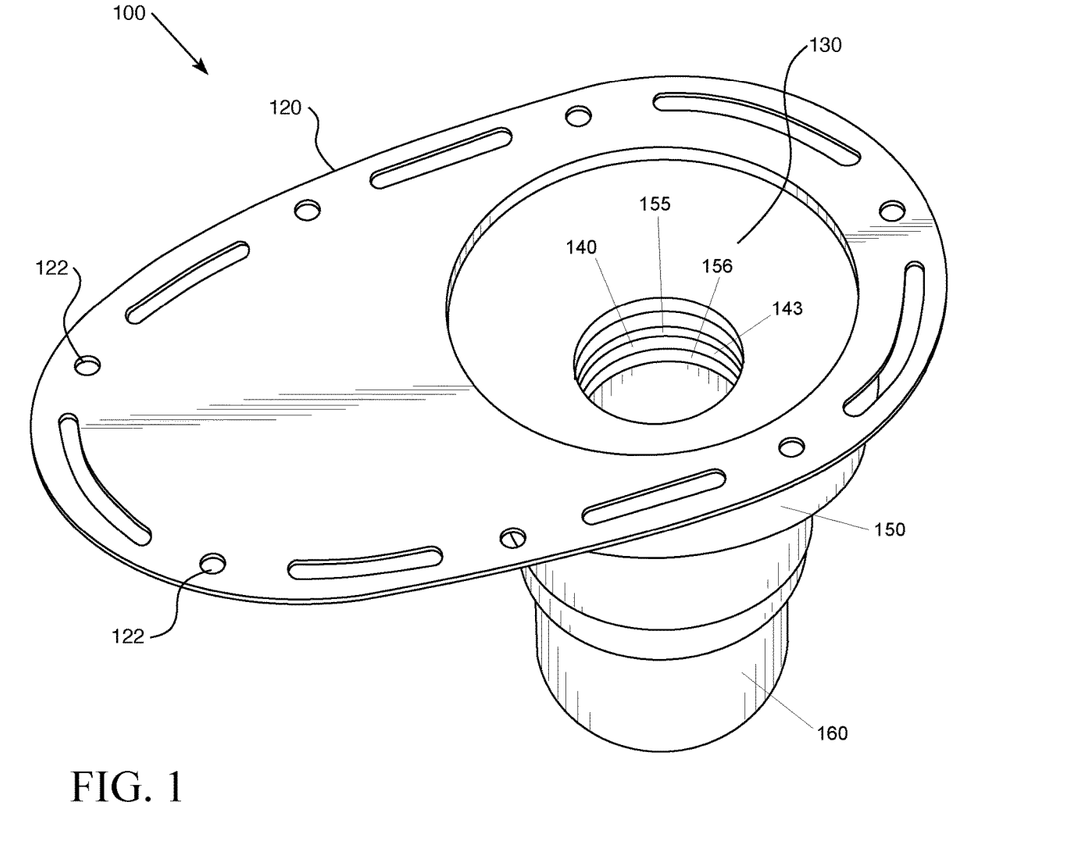
FIG. 1 depicts a top perspective view of drain device 100 of this invention.
Figure 2:
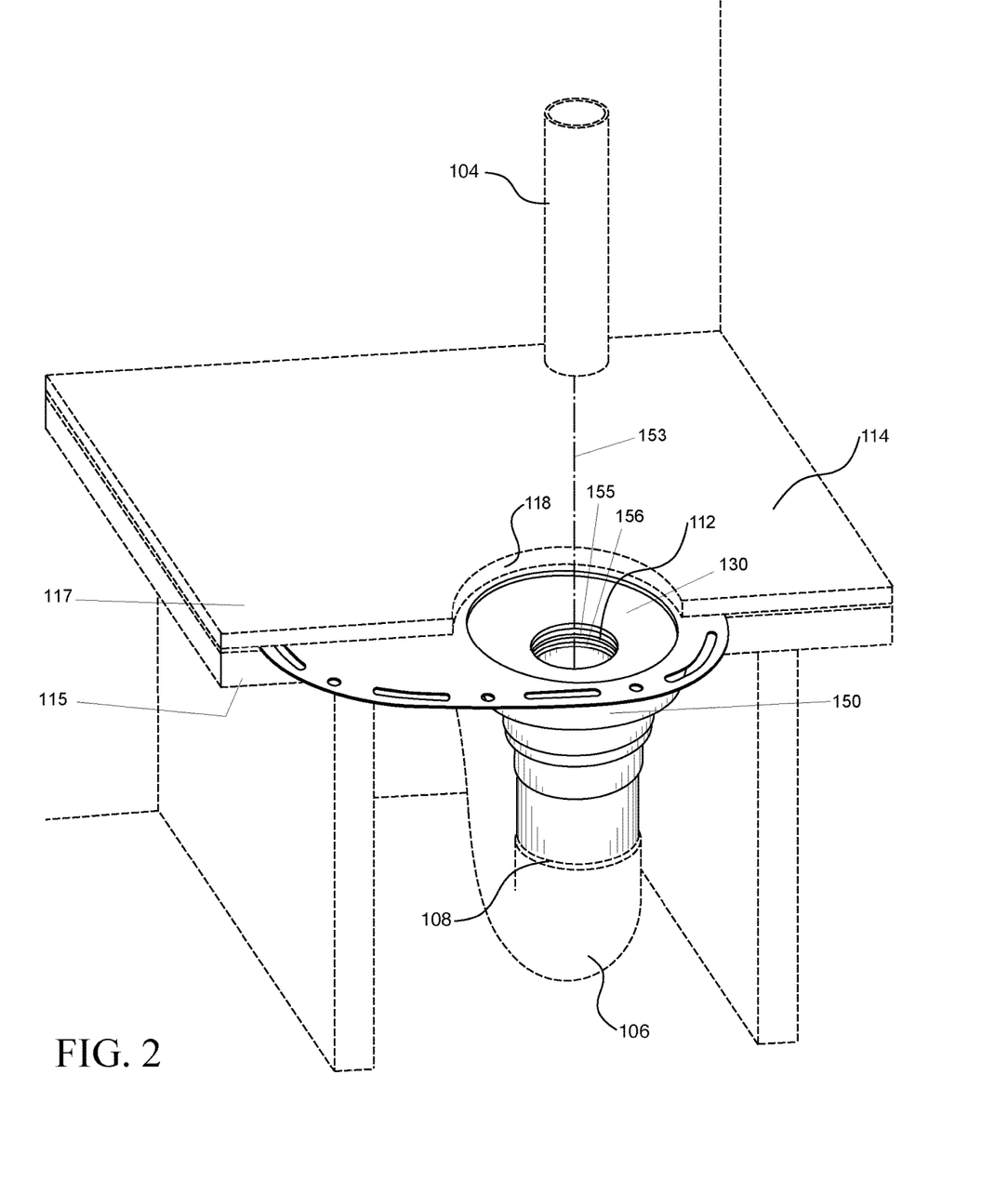
FIG. 2 depicts an exploded perspective view of device 100 of this invention attached to p-trap 106 with p-trap 106, tail pipe 104, and mounting surface 114 and the surrounding structure depicted in phantom.

Upper and lower apertures 134, 136 of compression cap 130 may be in co-axial alignment with drain body aperture 112 along drain body axis 153 (FIGS. 2, 4-5). The overall shape of the compression cap 130 embodiment illustrated in FIGS. 3-4 may be characterized as frustoconical in that the shape is that of a truncated cone.

Compression cap 130 rests on gasket 140. Gasket 140 has outer surface 141 (FIG. 4), inner surface 143 (FIG. 1), gasket flange 142, gasket body 144, and gasket base 146. As illustrated particularly in FIGS. 3-4, gasket body 144 defines a unitary gasket 140. Gasket 140 body 144 illustrated in FIGS. 1-5 includes an upper end 145, a lower end 147 and an intermediate portion 149 between ends 145, 147. Gasket inner surface 143 defines a cylindrical gasket aperture 151 co-axial with axis 153 and compression cap upper and lower apertures 134, 136 and drain body 150 upper and lower openings 125, 127.

Gasket body 144 is illustrated with at least one inwardly extending sealing rib 155 completely around inner surface 143 of gasket 140 toward upper end 145 of gasket 140. Two such ribs 155, 156 are illustrated in FIGS. 1-3 and 5. Referring to FIGS. 3-4, upper end 145 of gasket body 144 is illustrated with a cylindrical shape so as to have a close insert fit with circumferential gasket-support surface 135. Outer surface 141 of gasket body 144 is sized to fit closely within circumferential gasket-support surface 135 of the compression cap 130 limiting outward expansion of sealing rib 155 to thereby form a water-tight seal with sealing rib 155 and sealing rib 156 entirely around and pressed tightly against tail pipe 104 when tail pipe 104 is inserted into gasket 140.

Gasket flange 142 rests on the gasket support surface 137 of drain body 150. Gasket flange 142 and gasket base 146 create a gasket slot 148 therebetween. Slot 148 illustrated in FIGS. 3-4 is an annular slot 148 entirely around body 144 of gasket 140. Slot 148 defined between flange 142 and base 146 provides a type of catch 157 used to secure gasket 140 to drain body 150 and drain body 150 is secured to gasket 140 through the interaction of gasket slot 148. As shown in FIG. 3, drain body 150 gasket support surface 137 includes an inwardly extending annular edge 139 around drain body aperture 112. Gasket body 144 is of a deformable material. At rest, base 146 defining part of catch 149 has a shape (FIGS. 3-4). Base 146 of gasket body 144 is sufficiently deformable such that base 146 can be bent to change shape sufficient to ride over annular edge 139 while gasket 140 is pressed into drain body 150 such that annular edge 139 is received in slot 148 to catch or hold gasket 140 in place seating and holding gasket 140 with respect to drain body 150 once base 146 regains its original shape as is well-illustrated in FIG. 3. Gasket 140 may be removed from drain body 150 by reversing the aforementioned steps by pulling gasket 140 from drain body 150 causing base 146 to again deform and bend to allow the catch 149 provided by slot 148 and base 146 to release from drain body annular edge 139. If in place on drain body 150, compression cap 130 may be lifted from compression cap ledge 152 to provide access to drain body 150 for seating of gasket 140 on drain body 150 or removal of gasket 140 from drain body 150.

Compression cap 130 has tabs 128. Compression cap 130 is inserted into gasket body 144. Gasket body 144, preferably, completely surrounds drain aperture 112. Tabs 128 of compression cap 130 push gasket body 144 toward the drain aperture 112 and keep gasket body 144 in the desired position to form a water-tight or near water-tight seal.

Gasket 140 is preferably made of rubber. However, gasket 140 can be made of any suitable material, and all such materials are encompassed by this disclosure.

It is preferable that the diameter of the components of device 100 be the greatest at the upper aperture 134 of the compression cap 130 and decrease at the lower aperture 136 of compression cap 130 and continue to decrease through drain body 150 (and external pipe 170, if present, is preferably comparable in diameter to drain body 150) and decrease further at coupler 160. This continuous decrease in diameter creates a funnel effect to make device 100 as water-tight as possible.

Referring specifically to FIG. 5, the installation of device 100 can be clearly seen. Tub 102 has attached to it tub plumbing 116, which can include waste drain pipe 116a and overflow drain pipe 116b. Tail pipe 104 is attached to tub plumbing 116. Tail pipe (which is now attached to tub plumbing 116 and tub 102) is inserted into device 100 through the upper aperture 134 of compression cap 130.

Now adding FIG. 6 to the consideration, method 200 can be clearly seen. Method 200 has the following steps. As will be obvious to persons of ordinary skill in the art, the steps, or steps equivalent thereto, may be practiced in any reasonable order which will produce the desired result.

STEP 202 is the surface preparation step. In STEP 202, a mounting aperture 118 is created in the mounting surface 114. The mounting aperture 118 must be appropriately sized to receive device 100.

STEP 204 is an optional device preparation step. In optional STEP 204, a piece of external pipe 170 may be cut and attached to attachment end 154 of drain body 150. The desired size is the length of external pipe 170 necessary to correct any deficiencies in the length between the distance between attachment end 154 of drain body 150 or attachment end 162 of coupler 160 (if coupler 160 is present) and the attachment end 108 of p-trap 106 when device 100 is installed in the final position. The diameter of the external pipe 170 and the attachment end 154 is preferably compatible. It is preferable to attach external pipe 170 to attachment end 154 with glue, but any suitable fastener or adhesive can be used and is encompassed by this disclosure.

STEP 206 is an optional coupler preparation step. In this STEP 206, the coupler 160 with diameters on opposing ends to match attachment ends 108 and 154 or 172 is preferably first attached to attachment end 154 of drain body 150 or attachment end 172 of external pipe 170. Coupler 160 is preferably attached to attachment end 154 or 172 with glue, but any suitable adhesive or fastener can be used and is encompassed by this disclosure.

STEP 208 is the device installation step. In this STEP 208, device 100 is positioned within mounting aperture 118. Device 100 is aligned so flange 120 is accommodated by the walls of the structure or any other objects or barriers that are present. If present, attachment end 162 of coupler 160 is aligned with and then attached to attachment end 108. Attachment end 162 of coupler 160 is preferably attached to attachment end 108 with glue, but any suitable adhesive or fastener can be used and is encompassed by this disclosure.

As an alternative, if neither coupler 160 nor external pipe 170 is utilized, device 100 is positioned within mounting aperture 118. Device 100 is aligned so flange 120 is accommodated by the walls of the structure or any other objects or barriers that are present. Attachment end 154 is aligned with and then attached to attachment end 108. Attachment end 154 is preferably attached to attachment end 108 with glue, but any suitable adhesive or fastener can be used and is encompassed by this disclosure.

As a second alternative, if coupler 160 is not utilized, but external pipe 170 is utilized, device 100 is positioned within mounting aperture 118. Device 100 is aligned so flange 120 is accommodated by the walls of the structure or any other objects or barriers that are present. Attachment end 172 is aligned with and then attached to attachment end 108. Attachment end 172 is preferably attached to attachment end 108 with glue, but any suitable adhesive or fastener can be used and is encompassed by this disclosure.

STEP 210 is the device securing step. In this STEP 210, device 100 is secured to the mounting surface 114 through flange 120. Device 100 can be secured through the cooperation of fasteners and flange apertures 122. Fasteners can be screws or any appropriate fastener and all such fasteners are encompassed by this disclosure. Or, flange 120 of device 100 can be secured to mounting surface 114 through cement or any other appropriate adhesive and all such adhesives are encompassed by this disclosure.

STEP 212 is an optional mounting surface finishing step. In STEP 212, the mounting surface 114 is finished with tile, marble, or any other suitable finishing or covering material 117.

STEP 214 is the tail pipe installation step. In STEP 214, the tail pipe 104 is cut to a desired measurement and the desired measurement is one that the tail pipe will extend from the tub drain and/or plumbing 116 and reach the p-trap 106 when inserted through device 100. Then, the tail pipe 104 is attached to the tub plumbing 116 which may include waste and overflow drain pipes 116a and 116b. Preferably the tail pipe 104 is attached to the tub plumbing 116 in a male to female threaded relationship or through a friction lock relationship, but any suitable attachment between tail pipe 104 and tub plumbing 116 can be used and is encompassed by this disclosure.

STEP 216 is the tub installation step. In STEP 216, the tub 102 is lifted and flipped to a use position. The tail pipe 104 is aligned with the upper aperture 134 of the compression cap 130. Tail pipe 104 is inserted into the upper aperture 134 and pushed downward until it reaches the p-trap 106. The placement of tub 102 is adjusted until the tub 102 is in the desired position. A lubricant may be applied to tail pipe 104 before it is inserted into device 100 and any suitable and appropriate lubricant can be used and is encompassed by this disclosure.

While various embodiments and aspects of the present invention have been described above, it should be understood that they have been presented by way of example only, and not limitation. Thus, the breadth and scope of the present invention should not be limited by any of the above exemplary embodiments.

This application-taken as a whole with the abstract, specification, claims, and drawings being combined-provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure.

What is claimed is:

1. A drain apparatus for providing a water-tight connection between a tub waste pipe extending outward from an underside of a tub and a waste pipe of a building structure at a location beneath the tub, the drain apparatus comprising:
    a) a drain body defining upper and lower openings and a conduit defining a drain body aperture and a gasket support surface around the aperture between the openings, the drain body providing a waste-water connection between the waste pipes of the tub and the building structure;
    b) a flange associated with an upper side of the drain body, wherein the flange provides a mount for securing the drain body to a surface located beneath the tub;
    c) a compression cap received in the upper side of the drain body completely around the drain body aperture, wherein the compression cap includes a downwardly tapered surface which guides the tub waste pipe into the drain body and which terminates in a downwardly depending circumferential gasket-support surface defining a compression cap aperture in axial alignment with the drain body aperture; and
    d) a gasket mounted within the drain body and under the compression cap, the gasket having an outer surface with a catch having a shape, at least a portion of the catch being deformable to fit over the gasket support surface and hold the gasket in place with respect to the drain body upon return to the shape, the gasket further having an inner surface defining a gasket aperture in axial alignment with both the drain body and compression cap apertures, and an upper end with at least one inwardly extending sealing rib completely around the inner surface of the gasket toward the upper end, the upper end of the gasket being sized to closely fit within the gasket-support surface of the compression cap limiting outward expansion of the sealing rib to thereby form a water-tight seal with the sealing rib entirely around and pressed tightly against the tub waste pipe when the tub waste pipe is inserted into the gasket.

2. The drain apparatus of claim 1 further comprising: a coupler having a first end sized to receive waste water from the drain body, a second end sized to mate with the waste pipe of the building structure, and a waste water tube therebetween.

3. The drain apparatus of claim 1 wherein:
a) the drain body includes a compression cap ledge including an annular edge surface extending radially inward from the ledge around the drain body aperture; and
b) the gasket includes an annular gasket slot into which the edge surface of the ledge is inserted to secure the connection between the drain body and the gasket.

4. The drain apparatus of claim 1 wherein the compression cap, the flange, the gasket, and the drain body comprise a single, unitary assembly.

5. The drain apparatus of claim 1 wherein the flange of the drain body has an elliptical shape.

6. The drain apparatus of claim 1 further comprising at least one piece of external pipe connecting to the lower opening of the drain body, wherein the at least one piece of external pipe connects the drain body to the waste pipe of the building structure.

7. The drain apparatus of claim 1 wherein the compression cap is frustoconical and the downwardly depending gasket-support surface defines a cylinder.

8. The drain apparatus of claim 7 wherein the upper end of the gasket defines a cylinder within the cylinder of the downwardly depending gasket-support surface.

9. The drain apparatus of claim 8 wherein the cylindrical upper end of the gasket and the cylindrical downwardly depending gasket-support surface are joined by an insert fit.

10. The drain apparatus of claim 9 wherein:
a) the gasket further includes a unitary body including:
the upper end;
a lower end including a base around the outer surface of the gasket, the base having the shape and being deformable; and
an intermediate portion between the upper and lower ends, the intermediate portion including a flange extending radially outward from the intermediate portion and spaced from the base to define an annular slot therebetween and around the outer surface of the gasket and the catch includes the flange, base and the annular slot;
b) the drain body gasket support surface is an inwardly extending annular edge around the drain body aperture; and
c) the gasket is removably seated within the drain body by insertion of the annular edge of the drain body over the deformable base and into the annular slot of the gasket to thereby hold the gasket in place with respect to the drain body upon return of the base to the shape.

11. The drain apparatus of claim 10 wherein the compression cap is removably received in the drain body.

* * * * *